July 7, 1959  J. C. L. RODRIGUEZ  2,893,307
PORTABLE ELECTRIC COOKING DEVICE
Filed Oct. 14, 1957  5 Sheets-Sheet 1
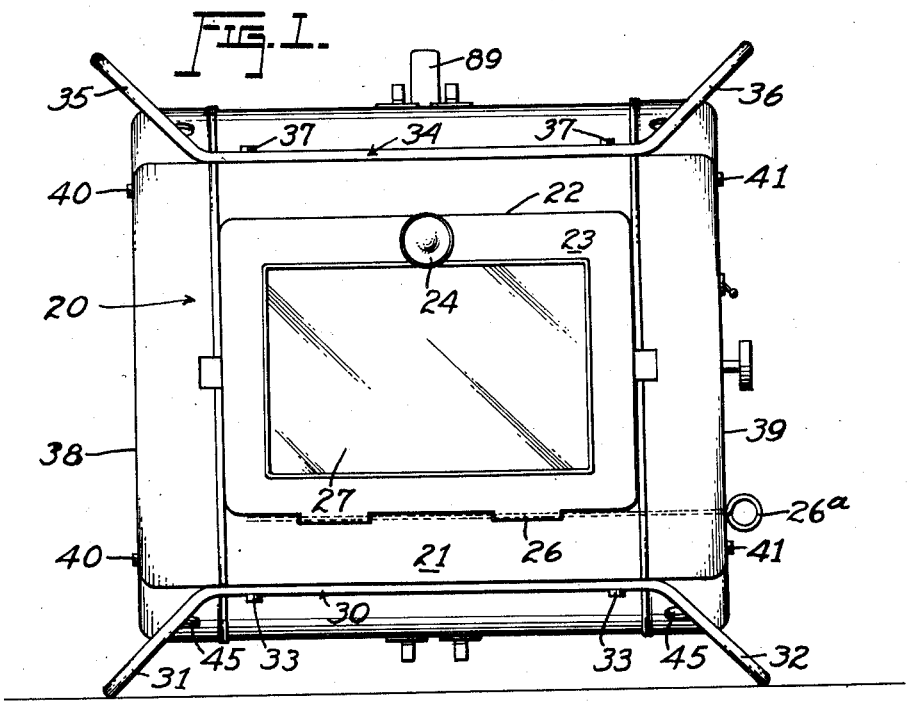
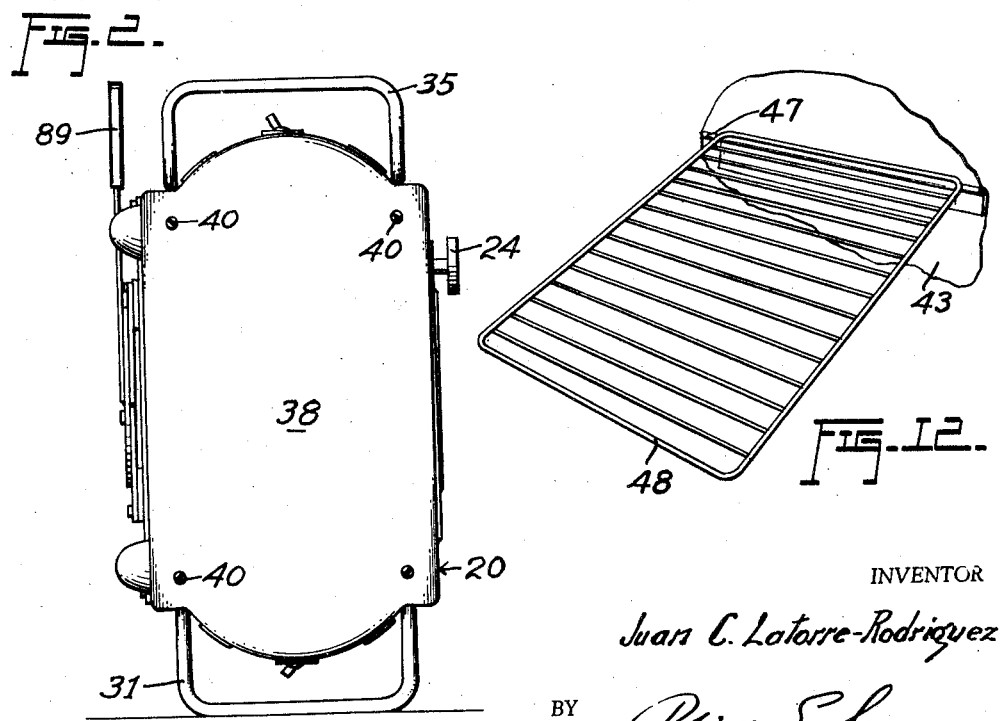
INVENTOR
Juan C. Latorre-Rodriguez
BY
ATTORNEY July 7, 1959 J. C. L. RODRIGUEZ 2,893,307
PORTABLE ELECTRIC COOKING DEVICE
Filed Oct. 14, 1957 5 Sheets-Sheet 2
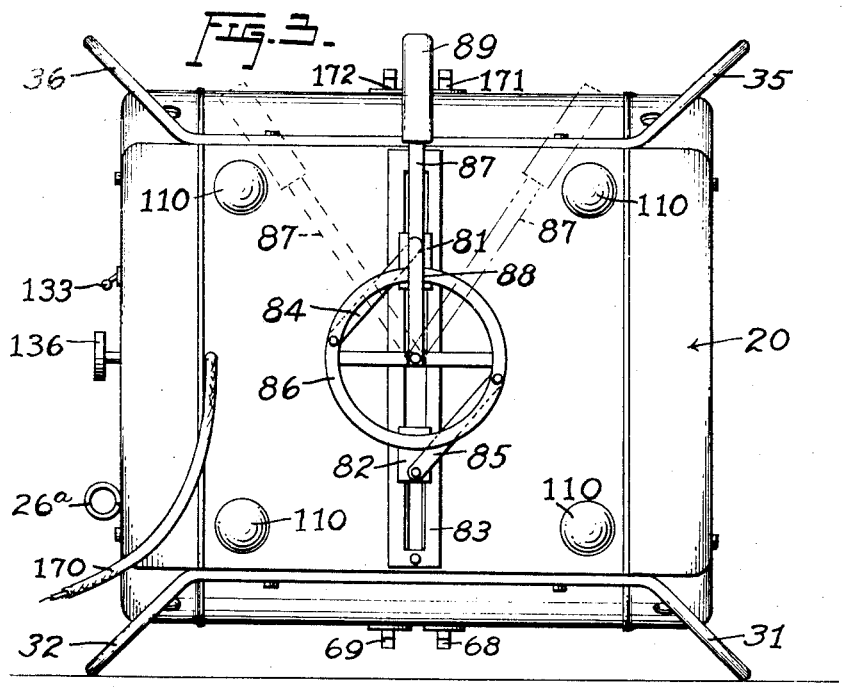
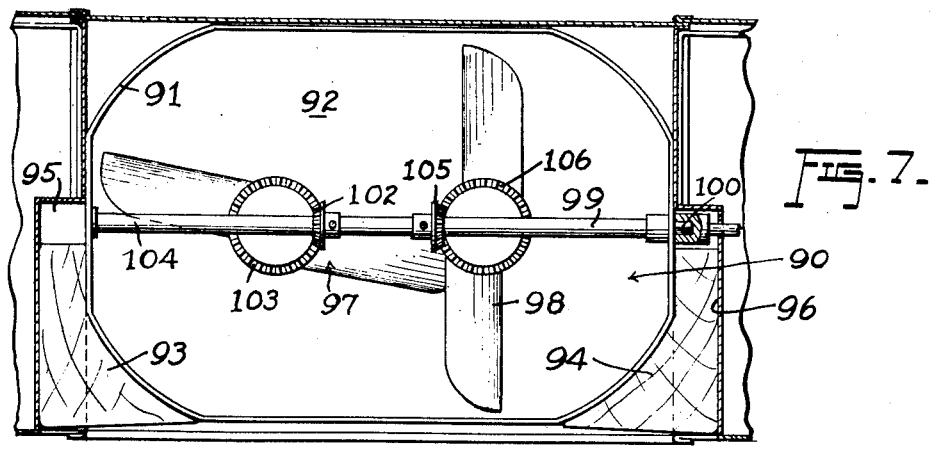
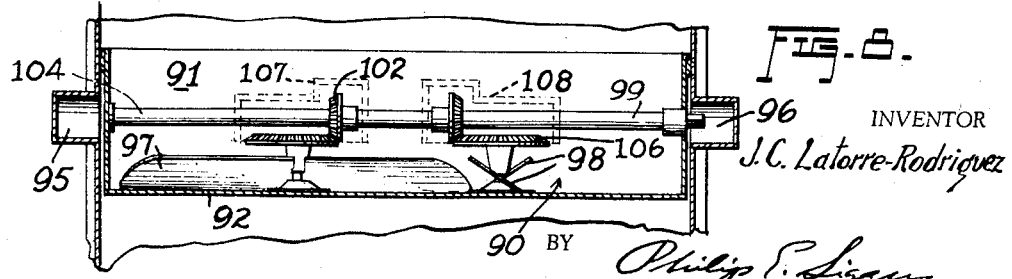
INVENTOR
J.C. Latorre-Rodriguez
BY
Philip P. Liggus
ATTORNEY

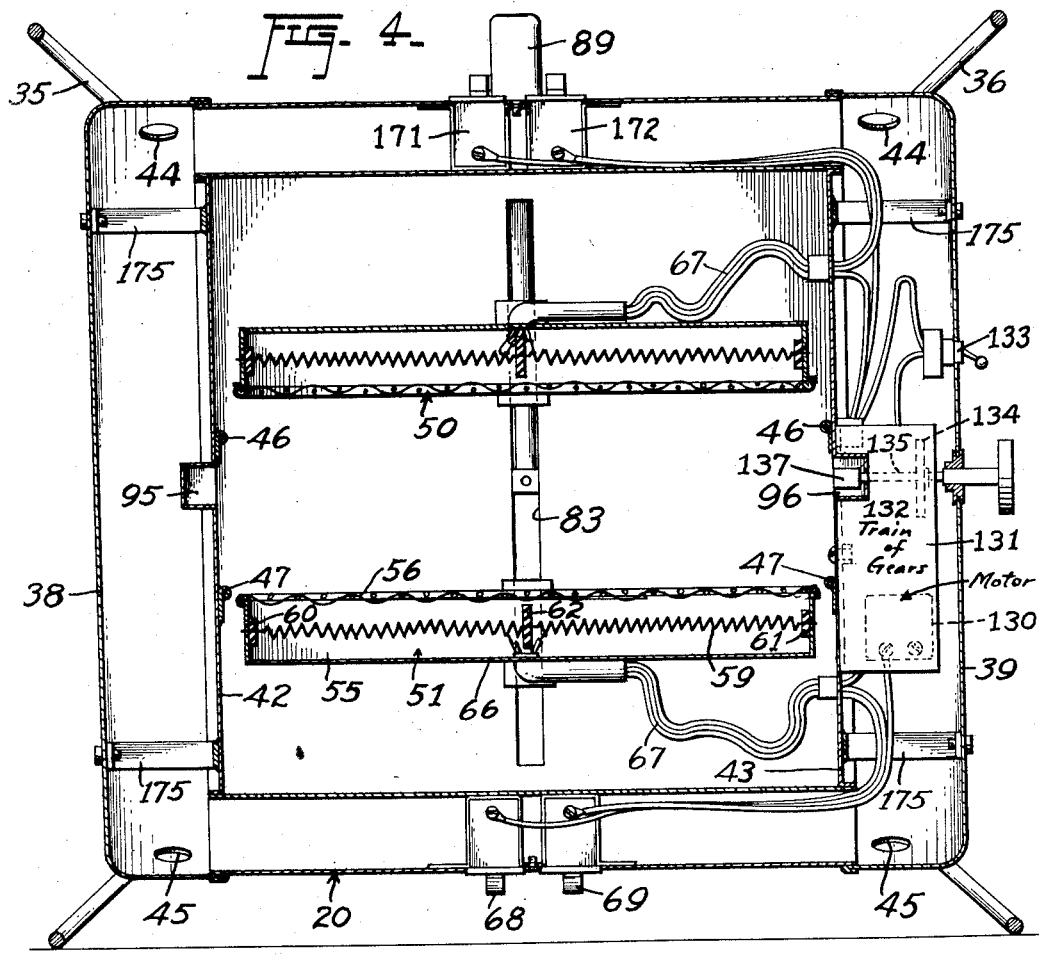

July 7, 1959 J. C. L. RODRIGUEZ 2,893,307
PORTABLE ELECTRIC COOKING DEVICE
Filed Oct. 14, 1957 5 Sheets-Sheet 4
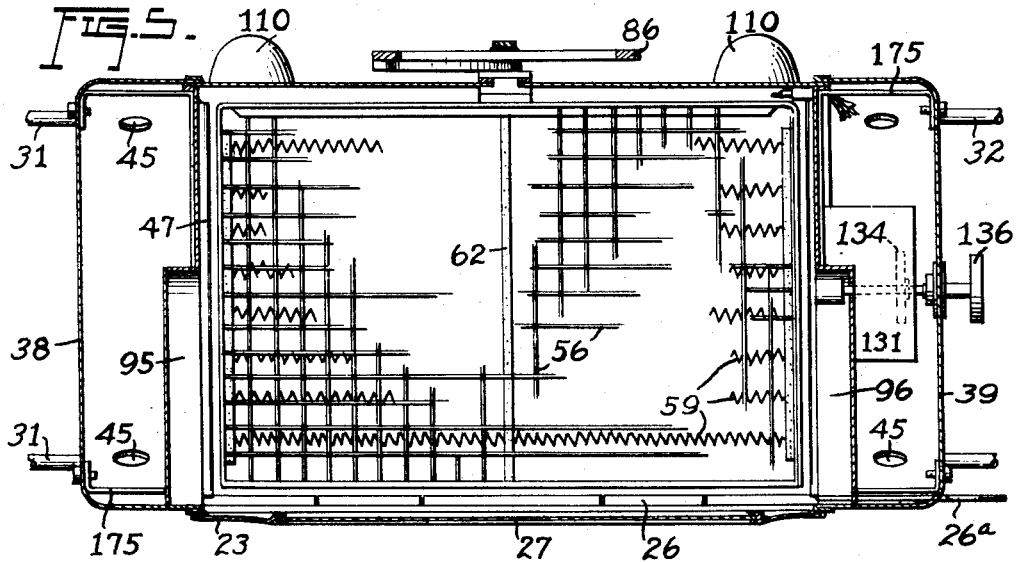
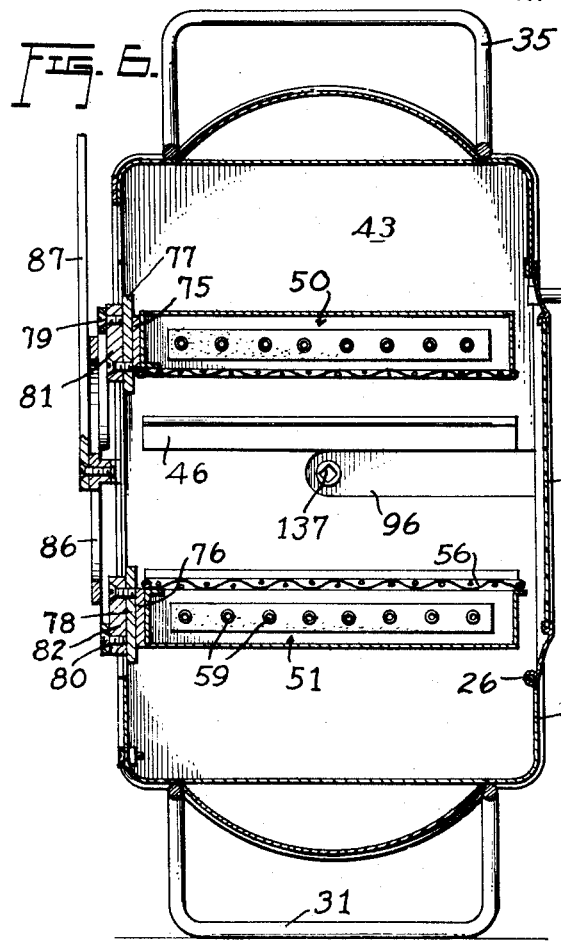
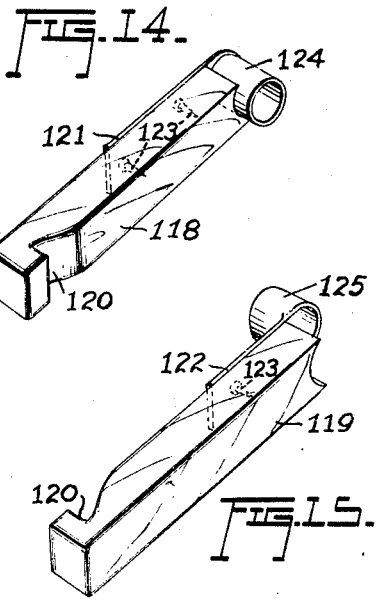
INVENTOR
Juan C. Latorre-Rodriguez
BY
ATTORNEY July 7, 1959  J. C. L. RODRIGUEZ  2,893,307
PORTABLE ELECTRIC COOKING DEVICE
Filed Oct. 14, 1957  5 Sheets-Sheet 5
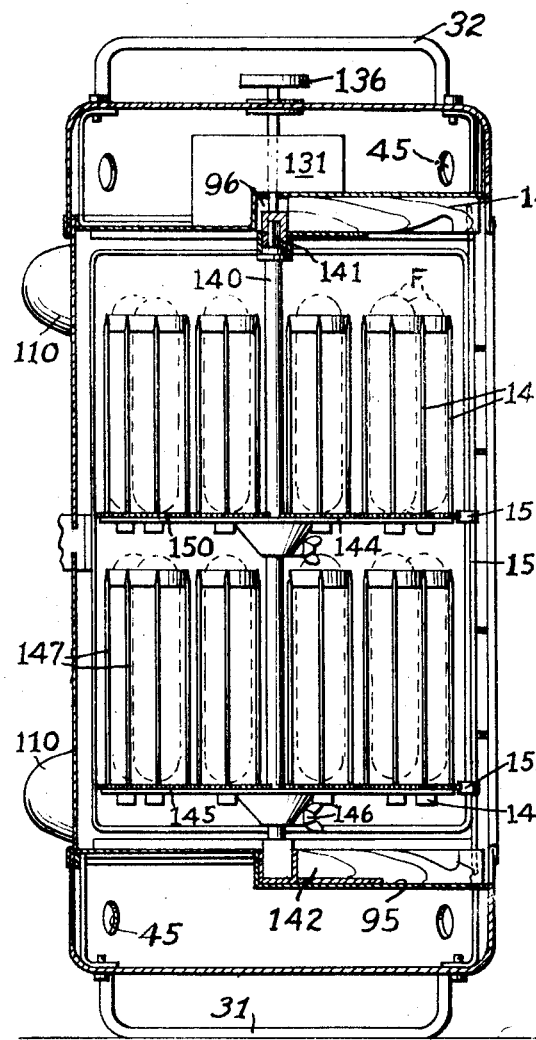
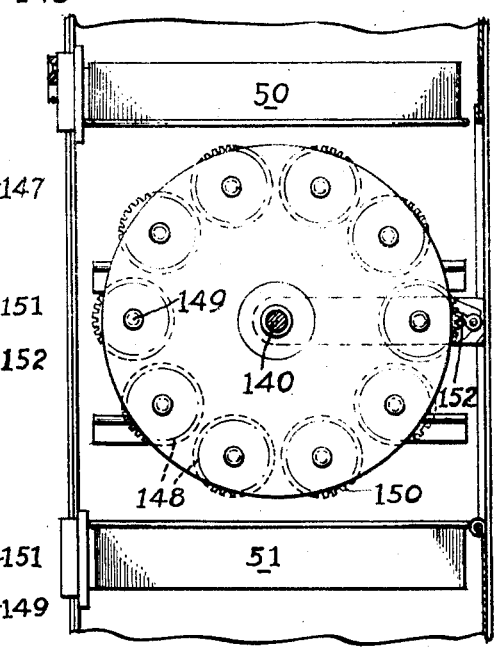
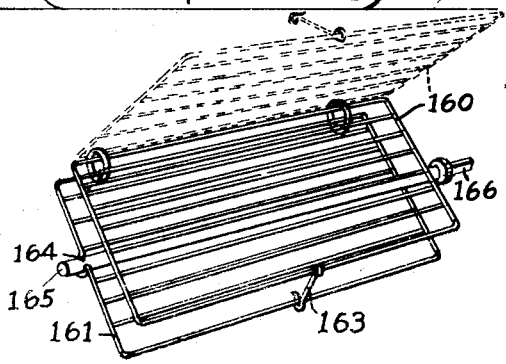
INVENTOR
Juan C. Latorre-Rodriguez
BY
ATTORNEY

United States Patent Office 2,893,307
Patented July 7, 1959

2,893,307

PORTABLE ELECTRIC COOKING DEVICE

Juan C. Latorre Rodriguez, Palmira, Colombia

Application October 14, 1957, Serial No. 689,887

12 Claims. (Cl. 99—421)

This invention relates generally to cooking vessels or equipment.

Among other objects, the invention aims to provide a portable electric cooking device which with the aid of attachments may be used to roast, broil, fry, boil or toast different foods such as meat, coffee, peanuts, frankfurters, eggs, bread, etc.

An additional object is to provide a portable electric cooking device which will cook in three different positions, viz., an upright position (with horizontal burners), an on-end position (with vertical burners), and a back-supported position, also with vertical burners.

Another object is to provide a cooker having electric burners which are adjustable by an operator controlled mechanism toward and from each other inside the body of the cooker.

A further object is to provide a nice control for the heat radiating from the adjustable electric burners, so that the cooking temperature may be controlled with a considerable degree of precision by the operator.

Another object is to provide a novel rotary spit or rotisserie for the cooker.

Another object is to provide a novel roaster for granular or berry-like foods such as coffee, peanuts and popcorn.

Another object is to provide an easily operated and novel frankfurter broiler of relatively large capacity.

A further object is to provide a novel rotating broiler for steaks and the like.

The invention has other objects which will be understood from the following description of a preferred embodiment of the invention and several cooking attachments used therewith.

In the accompanying drawings forming a part of this specification,

Fig. 1 is a front elevation of the apparatus;

Fig. 2 is an end elevation of the same;

Fig. 3 is a rear elevation of the same showing in dotted lines two extreme positions of the burner-positioning lever;

Fig. 4 is a vertical longitudinal section;

Fig. 5 is a horizontal longitudinal section;

Fig. 6 is a vertical cross section;

Fig. 7 is a fragmentary horizontal section showing an attachment for roasting coffee beans and like foodstuffs, supported in the cooking compartment of the apparatus;

Fig. 8 is a vertical central section through the attachment of Fig. 7, showing in dotted lines the casings or guards for the gear teeth;

Fig. 9 is a vertical cross section through the apparatus equipped with a frankfurter-roasting attachment, the frankfurters being indicated in dotted lines;

Fig. 10 is a fragmentary cross section through the apparatus and attachment of Fig. 9;

Fig. 11 is a fragmentary vertical section showing a rotisserie attachment and a tray placed in the cooking compartment, a chicken being indicated in dotted lines;

Fig. 12 is a perspective view of a gridiron which may be used in the cooking compartment, one wall of which is shown fragmentarily;

Fig. 13 is a perspective view of a steak broiling attachment to be used in the cooking compartment, showing in dotted lines an open position of the attachment;

Figs. 14 and 15 are perspective views of the two handles used for supporting and carrying the rotisserie, the frankfurter broiler and the steak broiler.

Referring particularly to the drawings, and first to Figs. 1, 2, and 3, the cooking device of my invention has a box-like metal body 20, brightly polished on the outside, and hollow on the inside to provide a cooking compartment, the surfaces of which are also brightly polished. The body 20 has a flat front face 21 provided with a rectangular opening 22 normally closed by a hinged door 23. Door 23 is brightly polished on the inside and has a turn-latch 24 adjacent its upper edge for engaging behind the edge of the opening 22 to latch the door. At its lower edge, the door is provided with a hinge 26 which is of the type that has a removable hinge pintle, so that the door may be readily taken off; a very desirable feature when the body 20 is laid on its back with the opening 22 uppermost. In this cooking position, the door would form an obstruction, as its wide-open position then would be nearly vertical. Located centrally of the door 23 is a glass pane or window 27 of a known type which does not become obscured by water vapor. This glass pane may be cemented or otherwise secured to the door.

Fixed to the bottom of the body 20 is a leg structure made of a brightly polished metal tube 30 which is bent in the form of an elongated loop with the two ends of the loop bent outwardly and downwardly to provide two U-shaped legs 31, 32. These legs 31, 32 also provide handles, if the cooker is upside down for any reason. The leg structure 30 is secured to the bottom of the cooker by means of screws 33. A similar tubular loop structure 34 having upwardly and outwardly bent handles 35, 36 is secured by screws 37 to the top of the cooker body. The handles or legs provided by the tubular structures 30, 34 are long enough to project beyond the end walls 38, 39 of the body, as shown in Fig. 1, the result being that a leg 31 and one of the handles 35 may together provide two legs for supporting the body on end, with end wall 38 underneath and the end wall 39 on top. The body may also be supported on end with the leg 32 and handle 36 at the bottom. This symmetrical design of the leg and handle structures 30, 34 and their arrangement with reference to the cooker body is believed to be novel in the art. A further advantage of the described leg and handle arrangement is that both of the handles keep sufficiently cool to permit the operator to pick up the cooker after it has been in use; and the legs space the cooker body so far from the support (usually a table, not shown) that the support will not become hot. Further to insure relative coolness of the exterior of the cooker body, both end walls 38, 39, are hollow shells (see Figs. 4 and 5) removably secured by studs 40, 41 to a pair of brackets 175 riveted to each of the end walls 42, 43 of the body 20 and providing about two to three inches of insulating air space at each end of the cooker. Two or more air holes 44, 45 at the top and bottom, respectively, of each shell 38, 39 give adequate movement of cooling air by convection from the bottom to the top. The brightly polished metal shells 38, 39, of course, radiate the heat rapidly which aids in cooling the handles and legs. The top and bottom of body 20 are also removable shells, preferably secured by the same screws which unite the leg and handle structures 30, 34 to the cooker, and spaced from the cooker body to provide insulating dead air spaces. Or, if preferred, fibrous insulation may be put in said spaces.

Secured to both the interior end walls 42, 43 are straight brackets or flanges 46, 47 which provide sliding supports for a gridiron or grated tray 48 such as the one shown in Fig. 12. Preferably there are two brackets on each wall 42, 43 so that two gridirons may be supported inside the cooking compartment, one above the other. When the food to be cooked is greasy, shallow flanged rectangular trays such as the tray 49, shown in Fig. 11, may be placed under the gridirons to collect the grease or fat dripping therefrom. Tray 49 may be supported directly on the lower burner assembly, to be described, with the lower burner cold so that it will not vaporize the fat caught by the tray.

There are two similar burner assemblies, indicated generally at 50, 51 supported within the cooking compartment of the body 20 and movable toward and from each other to adjust the heat sources to the cooking desired. The burner assemblies are always parallel to each other and are horizontal when the cooker body has the upright position of Figs. 1–3, but are vertical when the body is laid on its back. As these burners may be made in various ways, they are not shown in detail.

Burner assembly 51 consists of a metal tray 55, rectangular in form with four sides or flanges, open at the top and closed at the bottom. A wire grating 56 is removably secured upon the top edges of the tray 55 in any desired manner, thus affording protection to the heating elements, which may be helical wire resistance coils 59 or may be otherwise formed. These coils 59 are stretched to lie parallel to each other lengthwise of the tray 55, being supported out of contact with the metal tray by perforated electrical insulation strips 60, 61 removably secured in slots in the opposite ends of the tray, and by a perforated insulation strip 62 extending crosswise and centrally of the tray parallel to strips 60, 61. The resistance coils 59 pass through perforations in strip 62 and have their ends bent to pass through perforations in end strips 60, 61 respectively. The coils may be about ¾ in. to ⅞ in. apart, center to center, and their lowest portions may be about ¼ in. above the bottom 66 of tray 55. A brightly polished plate (not shown) may be fixed to the tray bottom 66 to reflect the radiant heat from the coils 59, or the tray bottom itself may be of chromium steel, etc. to reflect heat. The coils are energized through wires 67 connected to a source of electricity and preferably are controlled by two toggle switches 68, 69 fixed underneath the cooker body; the circuit being such that when one switch is closed, half the coils are energized, and when both switches are closed, all the coils are energized. The central insulation strip 62 has its front end reduced and passing through a perforation in the front wall of tray body 55, and its rear end is also reduced and extends through a perforation in the rear wall of the body. The perforations, and the struck-up tangs which stabilize the insulation strip 62 are not shown because these details form no part of the invention as claimed.

The upper burner assembly 50 is identical with the lower, except for a few steam or smoke vents (not shown) drilled in the top of the tray body. It will be clear from Figs. 4, 5 and 6 that the upper burner is like the lower burner turned upside down, hence the bottom of the lower burner corresponds to the top of the upper burner.

Each burner assembly 50, 51 has a plate 75, 76, respectively, welded or otherwise secured to the outside of the rear vertical wall midway between the ends of the burner. These plates 75, 76 close the perforations and provide a connection for slides 77, 78 which are brazed to the outside of plates 75, 76, respectively, and extend at right angles thereto. Slides 77, 78 have two screw holes to receive screws 79, 80 for connecting a complemental slide 81, 82 which runs outside the cooker body. See Fig. 3. Slides 81, 82 run on a slotted guide 83 extending centrally and vertically at the rear of the body and fixed thereto. Links 84, 85 are pivoted at one end to slides 81, 82 respectively and at their other ends said links are pivoted to a wheel 86 which has its center rotatably mounted on the back of the cooker body, midway between the upper and lower ends of the slotted guide 83. A lever 87 has its inner end pivoted at the center of wheel 86 and is brazed at an intermediate point 88 to the peripheral portion of said wheel. The outer end of the lever has an insulating handle 89 by which it may be swung from the full line position to either dotted line position, Fig. 3. In the left hand dotted line position, the slides 81, 82 will be about as far apart as permitted by the slotted guide 83. In the right hand dotted line position, said slides are close together, thus bringing the burner assemblies 50, 51 close together but never touching; perhaps 1½ inch to 2 in. apart. This is the quick-cooking or broiling position.

The cooker of my invention has been used very successfully in roasting coffee beans and may be used for roasting other granular foods such as peanuts, pine nuts, popcorn, etc. For such foods I employ the attachment shown in Figs. 7 and 8. A tray-like body 90 made of sheet metal has sides 91 about 3 in. high all around and a flat bottom 92. The green coffee beans to be roasted are placed in the roaster body 90 and the latter is placed in the cooker, being supported by two wooden handles 93, 94 at either end which slide into a pair of straight horizontal slots or recesses 95, 96 formed on the cooker body and extending half way from front to rear. The wooden handles besides acting as supporting flanges permit the operator to withdraw the roaster body 90 from the cooker by hand while the body 90 and contents are still hot. To agitate the coffee beans etc., a pair of slowly rotating agitators 97, 98 are used. These agitators are each two-bladed, with each blade inclined at an angle of about 30° to the horizontal (the flat bottom 92 over which the blades rotate), But the blades of each agitator are reversely inclined with respect to each other and the blades of the two agitators are always at right angles to each other (Fig. 7); this last result being accomplished by means of the gearing and shafting shown in Fig. 8. Shaft 99 has a squared end 100 by which it may be driven by a motor unit, to be described, and is journaled in a bearing 101 provided on an end wall of the roaster body 90. The other end of the shaft carries a bevel pinion 102 which meshes with a bevel gear 103 fixed to the shaft of bladed agitator 97. A spacer sleeve 104 extends from said other shaft end to the opposite end wall of roaster body 90. Shaft 99 also carries a bevel pinion 105 meshing with a bevel gear 106 fixed to the shaft of bladed agitator 98. The two agitators or stirrers are thus driven in opposite directions. Casings 107, 108 shield the gearing from the food that is poured into the roaster. The effect of the blades of the agitators is to slowly lift and turn over the coffee beans etc. during roasting. One blade follows the other, that is, each blade moves into the orbit of the other stirrer, with no interference. The roaster is preferably used interposed between the two burner assemblies which are brought as close together as possible. The full heat of both burners is used to bring the coffee beans etc. to the roasting temperature; then the top burner is turned off. An embodiment of the invention has roasted two pounds of green coffee in about 20 minutes, giving an excellent product.

When it is desired to convert the cooker to a rotisserie, the cooker is laid on its back, being then supported by four legs 110 which are fixed to the back (Figs. 2 and 3). The door 23 is taken off after removing its hinge pintle. The opening 22 then gives access from the top to the interior of the cooking compartment. Then the attachment 111 shown in Fig. 11 is inserted from above into the straight slots or recesses 95, 96 which are then vertical. The rotisserie attachment 111 comprises a shaft 112, which has one end squared as indicated at 113, to permit it to be driven. A pair of metal disks 114, 115 slidable on shaft 112 are secured by thumb screws 116 at the desired adjusted positions, each disk having about four prongs 117 joined to the periphery thereof and bent to extend approximately parallel to the axis of shaft 112. Also there are two wooden handles 118, 119 which serve as supports for the attachment, being slidable and seatable in the recesses 95, 96. The wooden handles 118, 119 each have finger notches 120 and metal adapters 121, 122, which are secured by screws 123 to the handles, have circular loops 124, 125 that are slipped over the ends of shaft 112 and hence may be removed when the shaft and the attached parts are to be washed. It will be observed that handle 119 has an adapter 122 whose loop 125 is open end to end and loosely surrounds the squared end 113 of the shaft so that said end may be engaged by the driving mechanism to be described. The end of handle 119 adjacent loop 125 is cut away on an arc to give clearance for the driving connection. The chicken or other food article that is to be cooked is placed between separate disks 114, 115, then the disks are brought together to cause the prongs to impale the chicken, the thumb screws are tightened, the rotisserie attachment is carried by the handles and placed in the cooking compartment, the electric current is turned on to energize the burners and also the shaft drive, and the chicken is slowly rotated between the radiant burners. A tray (not shown, but like tray 49, Fig. 11) is placed inside the cooking compartment at the bottom to catch the fat dripping from the chicken. The two handles 118, 119 make it very easy to manipulate the attachment with the chicken or other food article carried thereby and make it easy and safe to take the cooked chicken out of the hot oven.

The mechanism which rotates the rotisserie shaft 112, or alternatively, the roaster shaft 99, will now be described. It includes a small electric motor 130 fixed to the lower end of a housing 131 that is secured by screws or the like to the inner wall 43 adjacent the inner end of slot or recess 96. A set of reduction gears 132 within housing 131 is driven by the motor when the toggle switch 133 (Fig. 4) is closed. The last gear 134 of the gear train 132 is fixed to a shaft 135 which carries a knob 136 (Figs. 1 and 4), said shaft 135 being slidable in two spaced bearings provided in housing 131, this sliding taking place without disengaging gear 134. The inner end of shaft 135 is inside the inner end wall 43 and has a square socket 137 to fit over the previously described squared shaft end. By pulling on knob 136, the driving mechanism is disengaged from the roaster or rotisserie, while pushing on said knob engages the drive. The gear 134 moves with the sliding shaft 135 but stays meshed with the pinion of the gear train which drives it so that the gear train is not affected by sliding shaft 135, only the mechanical connection with the squared shaft end of the particular attachment to be driven. This is essentially a clutch connection and is so termed in some of the claims.

Referring to Figs. 9 and 10, an attachment for cooking frankfurters is shown, comprising a rotating structure adapted to be used with the cooker body supported on end, that is, with a handle 35 and a leg 31 providing two supporting legs, and with the door 23 removed and exposing the cooking compartment. The electric motor, gearing and clutch are then at the top, giving access to the knob 136 for engaging or disengaging the drive. The shaft 140, which has a squared upper end 141 for engaging the socket 137 of the motor drive, turns on its lower end in the recess 95 of the cooker body. A pair of wooden handles 142, 143 (like handles 118, 119 of the rotisserie) are engaged with the ends of shaft 140 so that the attachment may be picked up and inserted or removed from the cooker body, said handles fitting in the recesses 95, 96 with their notches accessible for gripping, as Fig. 9 shows. Two circular plates 144, 145 are secured to shaft 140 by means of set screws 146 so as to rotate with the shaft. Each plate has a plurality, say, ten, frankfurter holders arranged equiangularly adjacent the periphery of the plate and adapted to hold the frankfurter upright or parallel to the vertical axis of the shaft. These holders may be open-ended glass tubes (not shown) larger in internal diameter than the frankfurters, which are necessarily inserted in the ends of the tubes prior to the cooking. The glass used, of course, will be translucent to infrared rays. In lieu of the glass tubes, for each holder I may use four upright wires 147 fixed to a flanged disk 148, one frankfurter F being placed on end on disk 148 with the wires 147 surrounding it to keep it upright. The disks 148 may be of sheet metal, each with an integral cylindrical melted fat receptacle (not shown) located centrally and extending below the body of the disk. Disks 148 have bosses 149 providing bearings on which the disks may rotate, and have peripheral teeth 150 by which they may be rotated. A pair of lugs 151 which project slightly into the cooking compartment, being fixed to a bar 152 connecting handles 142, 143, will be engaged by the teeth 150 of the frankfurter holders, thereby to turn the frankfurters through an acute angle as the structure rotates, that is to say, each time each frankfurter comes to the opening of the cooker, it will be turned. This insures substantially uniform cooking on all sides. If preferred, a more substantial turning device working on the rack-and-gear principle may be used.

Referring to Fig. 13, an attachment for broiling steaks etc. is shown comprising two hinged wire gridirons 160, 161, hingedly connected by two or more rings 162, with a hook or hooks 163 to hold the gridirons clamped together when a steak or other meat is in the attachment. The lower grid 161 has its end wires bent in an arc and brazed as at 164 to a shaft 165, which has a squared end 166 and is of the correct size to fit in the slots or recesses 95, 96 of the cooker body, with the squared end 166 engageable by the square socket 137 on the shaft 135. The cooker as explained above is placed on its back and the door 23 is removed. The broiler turns slowly on the axis of shaft 135 while exposed to radiant heat from the energized burners 50, 51. Fat drippings will be caught by a tray placed underneath the rotating broiler, as explained in connection with the rotisserie attachment of Fig. 11.

The cooking apparatus receives electric energy from a cable 170 electrically connected with a source of electricity, said cable being led to the interior of the body and there being connected through switches 68, 69, and 171, 172 with the burners 51 and 50, respectively. The two switches 68 and 69 at the bottom of the device control the lower burner 51 and make it possible to have half the coils energized or all the coils energized as preferred. The switches 171, 172 similarly control the heat emanating from the upper burner 50. The switches control the burners irrespective of the adjusted positions of the burners, because the conductors or loads to the burners are flexible.

The apparatus of the invention permits hamburgers to be cooked very rapidly, because the two burners will cook them simultaneously on two sides; furthermore, the cooking will be greaseless because any fat in the hamburgers will drip down into a tray. Sliced bread may be laid on the lower burner, with the upper burner adjusted a short distance away, and with half the coils of both burners energized, the bread will be toasted very rapidly. The lower burner used alone will be found convenient for cooking small quantities of rice, or boiling or scrambling eggs, or heating ("grilling") sandwiches, or warming up "left-overs."

Each burner may be cleaned without disconnecting its coils by removing the slidable bottom plate and by lifting off the grating. The removed plate and grating may then be washed with a detergent and replaced.

All references to the squared end of the rotatable shafts are intended to include hexagonal ends, or any mechanical equivalent of a squared end, such as a clutch. Other references in the specification to details of construction will be understood to be merely by way of

What I claim is:

1. A portable electric cooking device comprising a body having a rectangular cooking compartment with an opening at the front leading to said compartment; the compartment having end walls leading from said opening rearwardly to a back wall; the back wall of the compartment having a straight vertical slot opening; an electric burner in the upper part of the compartment; another electric burner in the lower part of the compartment; slides movable on opposite sides of the straight slot opening; means to connect said slides with said burners; a source of electricity; flexible cables connecting the source of electricity with the two burners; and a mechanism including a lever mounted to swing on the outside wall of the back of the body for moving said slides along said slot opening and hence for adjusting the burners toward and from each other in said compartment.

2. The invention defined in claim 1, wherein the end walls of the compartment have straight slots or recesses which are parallel to each other and extend from the front opening half way to the back, said slots or recesses having walls which are adapted to support a food-holding attachment; and a pair of straight ribs or projections, one above, the other below each of said straight slots, the pairs of ribs on opposite sides of the opening being in the same horizontal planes and providing sliding supports in the cooking compartment for trays, gridirons, etc.

3. A portable electric cooking device adaptable for roasting, toasting, broiling or frying foods comprising a body having a cooking compartment and an opening in the front leading to said compartment; a readily removable door closing said opening; plural leg means fixed to said body at different points and projecting therefrom so as to support the body off a table or other support when the body is upright, or when it is on end, or when it is laid on its back; a pair of electric burners in said compartment; a source of electricity for energizing said burners; food-carrying means rotatably mounted in said compartment between said burners; an electric motor mounted on said body and connected to said source; a reduction gear train also mounted on said body and adapted to be driven by said motor; operator-controlled clutch means associated with said gear train for connecting the gear train to said rotatable food-carrying means; the cooking compartment having end walls leading from said front opening to the back; said end walls each having a straight slot or recess half way between the top and bottom and extending from the front half way to the back; said slots or recesses having walls providing supports for food-carrying means adapted to be rotated in said compartment between said burners; said clutch means being located adjacent the inner end of one of said slots or recesses.

4. A portable electric cooking device comprising, in combination, a body having a cooking compartment with an opening; a door closing said opening; readily removable means securing the door so that it may be taken off the body; legs fixed to the body on the underside, at the top and at the back and adapted to support the body upright, on end, or laid on its back with the opening at the top; a pair of electric burners which are horizontal when the body is vertical and which are vertical when the body is on end or laid on its back; a source of electricity connected to the burners; means on the body for adjustably supporting the burners so that they may be separated by approximately the width of said opening or may be moved close together without touching; the two burners being so constructed that they direct their radiant heat toward each other, so that articles of food may be cooked rapidly on opposite sides when placed between the two energized burners.

5. The invention defined in claim 4, wherein the compartment has recesses at opposite ends and there is an open metal tray having handles which are poor heat conductors, said handles being seated on said recesses to support the tray horizontally; a rotatable stirring means being mounted on the tray to stir and agitate food particles placed in the tray; an electric motor on the body; a reduction gear train on the body and driven by the motor; means to connect the motor with the source of electricity; a switch to control operation of the motor; and a clutch operable manually to connect the gear train with the rotatable stirring means.

6. The invention defined in claim 5, wherein the rotatable stirring means includes two two-bladed stirrers with the blades thereof at acute angles to the bottom of the tray, which is flat, and having their lower edges substantially in contact with said flat bottom, the stirrers being close enough together so that each blade of one stirrer moves into the orbit or area traversed by the other stirrer, the angles of the blades of each stirrer being oppositely inclined, a shaft and bevel gearing being supported on the tray to drive the stirrers in opposite directions when the shaft is connected by said clutch to said motor-driven gear train.

7. The invention defined in claim 4, wherein the body has bearings for a rotating shaft adapted to removably support said shaft about in the middle of said compartment with said shaft horizontal when the body is upright; a reduction gear train being mounted on the body; an electric motor driving the gear train; means including a switch to connect the electric motor with the source of electricity; and a manually operable clutch to connect the gear train with any shaft that may be placed on said bearings.

8. The invention defined in claim 7, wherein the bearings removably support a shaft having prongs adjustable along the shaft for impaling a food article to be roasted.

9. The invention defined in claim 7, wherein the bearings removably support a shaft having a pair of hinged grids fixed thereto and adapted to be clamped together to hold an article of food to be broiled.

10. The invention defined in claim 7, wherein the bearings removably support a shaft carrying a plurality of frankfurter holders; each holder being individually rotatable on its own axis; stationary means being provided on the body to engage each holder as it is carried around by rotation of said shaft to partially rotate said holder thereby to turn the frankfurter held thereby.

11. A portable electric cooker comprising, in combination, a body having a cooking compartment; electric burners in said cooking compartment; a source of electricity connected to said burners; said compartment having a front opening with a door, a top wall, a bottom wall, a back wall and two end walls; the end walls each having a straight slot or recess formed therein and extending horizontally from the front opening substantially half way to the back wall; a pair of handles made of a material which is a poor conductor of heat and slidably fitting said recesses; a shaft rotatably supported on the inner ends of said handles; means fixed to said shaft to hold an article of food to be cooked; the outer ends of said handles being readily accessible from the front of said compartment when the door is open or removed, so that the article of food on said shaft may be removed from said compartment, after the cooking is completed, by merely grasping said handles and pulling the shaft out of the compartment; the inner end of one of the handles having a loop through which the adjacent end of the shaft extends, said adjacent end being squared; and an electric motor drive unit is mounted on said body and is engageable by the operator with said squared shaft end to rotate said shaft, the source of electricity being connectible by a switch with said motor drive unit.

12. A portable electric cooker comprising, in combination, a body having a cooking compartment; electric burners in said cooking compartment; a source of electricity connected to said burners; said compartment having a front opening with a door, a top wall, a bottom wall, a back wall and two end walls; the end walls each having a straight slot or recess formed therein and extending horizontally from the front opening substantially half way to the back wall; a pair of handles made of a material which is a poor conductor of heat and slidably fitting said recesses; a shaft rotatably supported on the inner ends of said handles; means fixed to said shaft to hold an article of food to be cooked; the outer ends of said handles being readily accessible from the front of said compartment when the door is open or removed, so that the article of food on said shaft may be removed from said compartment, after the cooking is completed, by merely grasping said handles and pulling the shaft out of the compartment; two burners, one near the top, the other near the bottom, being supported in said compartment; and operator-actuated means being provided to adjust the positions of said burners toward and from each other, said last named means being mounted on the outside wall of the back of the body and being operable in any position of the body.

References Cited in the file of this patent

UNITED STATES PATENTS

| Number | Name | Date |
|---|---|---|
| 1,586,738 | Guy-Pell | June 1, 1926 |
| 1,702,673 | Underwood | Feb. 19, 1929 |
| 1,955,867 | Wilkie et al. | Apr. 24, 1934 |
| 2,020,807 | Speakman | Nov. 12, 1935 |
| 2,091,746 | Wiley | Aug. 31, 1937 |
| 2,331,707 | Lotter | Oct. 12, 1943 |
| 2,391,571 | Hennessy | Dec. 25, 1945 |
| 2,478,253 | Doner | Aug. 9, 1949 |
| 2,485,359 | Cook et al. | Oct. 18, 1949 |